(12) United States Patent
Lanci et al.

(10) Patent No.: US 10,023,814 B2
(45) Date of Patent: Jul. 17, 2018

(54) NOBLE METAL HYDROGENATION CATALYSTS WITH LOW CRACKING ACTIVITY

(71) Applicants: Michael P. Lanci, Flemington, NJ (US); Stuart L. Soled, Pittstown, NJ (US); Javier Guzman, Easton, PA (US); Sabato Miseo, Pittstown, NJ (US); Thomas Elmer Green, Hamilton, NJ (US); Joseph Ernest Baumgartner, Califon, NJ (US)

(72) Inventors: Michael P. Lanci, Flemington, NJ (US); Stuart L. Soled, Pittstown, NJ (US); Javier Guzman, Easton, PA (US); Sabato Miseo, Pittstown, NJ (US); Thomas Elmer Green, Hamilton, NJ (US); Joseph Ernest Baumgartner, Califon, NJ (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 220 days.

(21) Appl. No.: 14/714,703

(22) Filed: May 18, 2015

(65) Prior Publication Data

US 2015/0353845 A1 Dec. 10, 2015

Related U.S. Application Data

(60) Provisional application No. 62/009,373, filed on Jun. 9, 2014.

(51) Int. Cl.
*C10G 45/52* (2006.01)
*C10G 45/00* (2006.01)
(Continued)

(52) U.S. Cl.
CPC .............. *C10G 45/52* (2013.01); *B01J 21/12* (2013.01); *B01J 23/42* (2013.01); *B01J 23/44* (2013.01);
(Continued)

(58) Field of Classification Search
CPC .......... C10G 45/52; C10G 45/00; B01J 31/28; B01J 31/0241
See application file for complete search history.

(56) References Cited

U.S. PATENT DOCUMENTS 6,288,007 B1 9/2001 Lindblad et al.

FOREIGN PATENT DOCUMENTS

| GB | 790476 | * | 2/1958 | |
| GB | 1501346 | * | 5/1976 | .............. B01J 23/40 |
| GB | 1501346 | | 2/1978 | |

OTHER PUBLICATIONS

Jukic, Petroleum refining and petroleum processes, Faculty of Chemical Engineering and Technology, University of Zagreb, 2013.*

(Continued)

*Primary Examiner* — In Suk C Bullock
*Assistant Examiner* — Youngsul Jeong
(74) *Attorney, Agent, or Firm* — Andrew T. Ward

(57) ABSTRACT

Methods are provided for modifying hydrogenation catalysts having silica supports (or other non-alumina supports) with additional alumina, and using such catalysts to achieve unexpectedly superior hydrogenation of feedstocks. The modified hydrogenation catalysts can have a relatively low cracking activity while providing an increased activity for hydrogenation.

15 Claims, 9 Drawing Sheets

(51) Int. Cl.
*B01J 23/42* (2006.01)
*B01J 23/44* (2006.01)
*B01J 31/02* (2006.01)
*B01J 31/28* (2006.01)
*B01J 21/12* (2006.01)
*B01J 23/46* (2006.01)
*C10G 45/34* (2006.01)
*C10G 45/46* (2006.01)
*B01J 37/02* (2006.01)
*B01J 21/08* (2006.01)
*B01J 21/04* (2006.01)

(52) U.S. Cl.
CPC ........... *B01J 23/464* (2013.01); *B01J 23/468* (2013.01); *B01J 31/0241* (2013.01); *B01J 31/28* (2013.01); *B01J 37/0201* (2013.01); *B01J 37/0203* (2013.01); *C10G 45/00* (2013.01); *C10G 45/34* (2013.01); *C10G 45/46* (2013.01); *B01J 21/04* (2013.01); *B01J 21/08* (2013.01); *C10G 2300/202* (2013.01)

(56) References Cited

OTHER PUBLICATIONS

PCT Application No. PCT/US2015/031465, Communication from the International Searching Authority, International Search Report and Written Opinion, Forms PCT/ISA/220, PCT/ISA/210 and PCT/ISA/237, dated Aug. 11, 2015, 9 pages.

\* cited by examiner

| | Pt/Pd ratio | Pt (wt %) | Pd (wt %) | g Pt | moles Pt | g Pt solution | moles Pd | g Pd solution | moles Pd+Pt |
|---|---|---|---|---|---|---|---|---|---|
| 6a | 1:0 | 0.80 | 0 | 0.16 | 0.00082 | 0.319 | 0 | 0 | 0.000820 |
| 6b | 0:1 | 0 | 0.4365 | 0 | 0.00000 | 0.000 | 0.00082 | 1.027 | 0.000820 |
| 6c | 1:1 | 0.40 | 0.2183 | 0.08 | 0.00041 | 0.160 | 0.00041 | 0.514 | 0.000820 |
| 6d | 3:1 | 0.601 | 0.1085 | 0.1202 | 0.00062 | 0.240 | 0.00020 | 0.255 | 0.000820 |
| 6e | 5:1 | 0.667 | 0.073 | 0.1334 | 0.00068 | 0.266 | 0.00014 | 0.172 | 0.000821 |
| 6f | 1:3 | 0.199 | 0.328 | 0.0398 | 0.00020 | 0.079 | 0.00062 | 0.772 | 0.000820 |
| 6g | 1:5 | 0.127 | 0.368 | 0.0254 | 0.00013 | 0.051 | 0.00069 | 0.866 | 0.000822 |
| 6h | 2:1 | 0.53 | 0.145 | 0.1068 | 0.00055 | 0.213 | 0.00027 | 0.341 | 0.000820 |
| 6i | 1:2 | 0.27 | 0.29 | 0.054 | 0.00028 | 0.108 | 0.00055 | 0.682 | 0.000822 |

FIG. 1

| Example # | Catalyst Description | Temp (°C) | Rate mol/mol$_{cat}$/h | TOF mol/mol$_{catsurf}$/h |
|---|---|---|---|---|
| 2 | Pt(Arg)/SiO$_2$ Arginine prep. | 300 | 306 | 585 |
| 3a | 1.0% Al$_2$O$_3$ IW/Pt(Arg) (Al added to Pt/Si) | 300 | 6895 | 16984 |
| 3b | 2.1% Al$_2$O$_3$ IW/Pt(Arg) (Al added to Pt/Si) | 300 | 2429 | 5609 |
| 3b-R | Pt(Arg)/2.1% Al$_2$O$_3$ IW/SiO$_2$ (Pt added to Al/Si) | 300 | 5568 | 16140 |
| 5f | Pt(Arg)/1% Al$_2$O$_3$ IW/SiO$_2$ (Pt added to Al/Si) | 300 | 5621 | 16729 |
| 7 | (1% Al$_2$O$_3$ + Pt(Arg)(8:1 to mols Pt)) on SiO$_2$ coimpregnation | 300 | 3544 | 12479 |

FIG. 8

NOBLE METAL HYDROGENATION CATALYSTS WITH LOW CRACKING ACTIVITY

CROSS-REFERENCE TO RELATED APPLICATIONS

This application claims priority to U.S. Provisional Application Ser. No. 62/009,373 filed Jun. 9, 2014, herein incorporated by reference in its entirety.

FIELD

This invention relates to hydrogenation catalysts and methods for using such catalysts.

BACKGROUND

Catalysts with aromatic saturation and/or olefin saturation activity are employed in a variety of manners in a refinery setting. For example, in lubricant base oil production, a final aromatic saturation step in the presence of a catalyst with high activity for aromatic saturation can be valuable for reducing the aromatics content of the base oil product. Catalysts with hydrogenation activity can also be useful for treating an effluent from a cracking or hydrocracking process to reduce the olefin content or aromatic content of the cracked product.

U.S. Pat. No. 6,288,007 describes a hydrogenation catalyst with high sulfur tolerance. One version of the hydrogenation catalyst can include a silica substrate impregnated with a noble metal that also includes a surface-modification with an aluminum-containing compound. Examples of catalysts having silica substrates are described that include surface-modification amounts of 2.9 wt %, 5.8 wt %, and 8.1 wt % of aluminum.

SUMMARY OF PREFERRED EMBODIMENTS OF THE INVENTION

In one aspect, a method for hydrogenating a feedstock is provided. The method includes exposing a hydrocarbonaceous feedback to a supported catalyst under effective hydrogenation conditions to form a hydrogenated effluent, the supported catalyst comprising a Group VIII noble metal on a silica support, the supported catalyst further comprising about 0.3 wt % to about 3.0 wt % alumina deposited on the silica support.

In another aspect, a hydrogenation catalyst is provided. The hydrogenation catalyst includes about 0.1 wt % to about 5 wt %, based on total catalyst weight, of a Group VIII noble metal on a silica support; and about 1.1 wt % to about 3.0 wt %, based on a total catalyst weight, of alumina deposited on the silica support, wherein the silica support is an amorphous silica support, a mesoporous silica support, or a combination thereof.

BRIEF DESCRIPTION OF THE DRAWINGS

FIG. 1 shows examples of hydrogenation catalysts made using varying amounts of Pd and Pt as hydrogenation metals.

FIG. 8 shows activities for various hydrogenation catalysts.

DETAILED DESCRIPTION OF THE PREFERRED EMBODIMENTS

Figure 2:
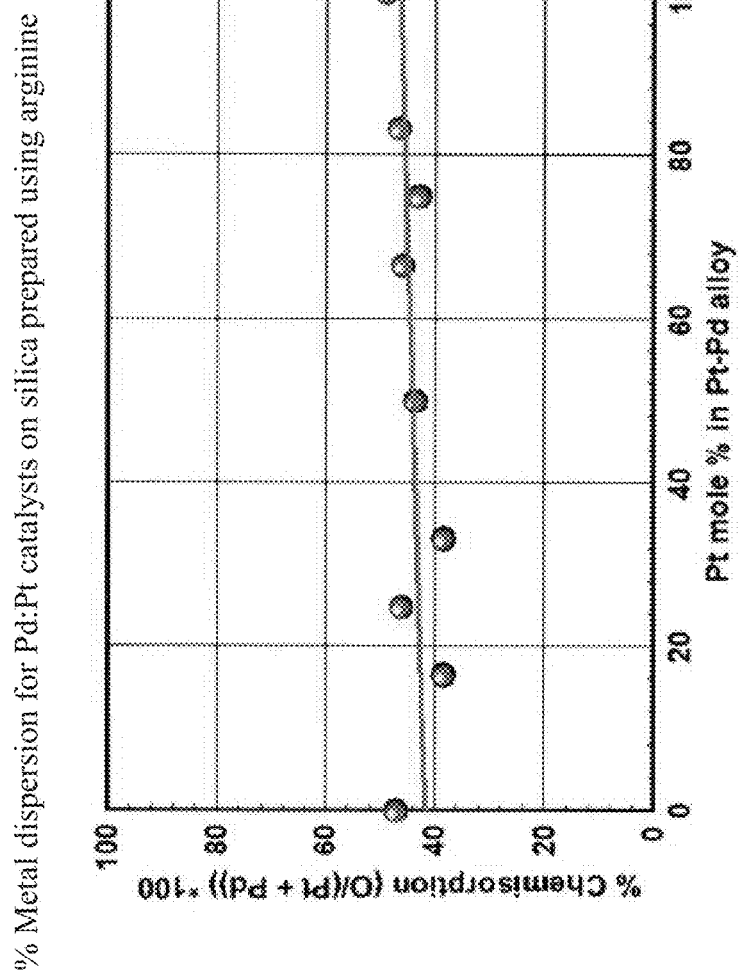
FIG. 2 shows metal dispersion values for various hydrogenation catalysts.

In various aspects, methods are provided for modifying hydrogenation catalysts having silica supports (or other non-alumina supports) with additional alumina, and using such catalysts to achieve unexpectedly superior hydrogenation of feedstocks. The modified hydrogenation catalysts can have a relatively low cracking activity while providing an increased activity for hydrogenation. This can allow use of the modified hydrogenation catalysts for performing hydrogenation of a feedstock at higher temperatures while causing a reduced or minimized amount of cracking of the feedstock. The modified hydrogenation catalysts also exhibit unexpectedly high activity for performing hydrogenation relative to the activity for an unmodified catalyst and/or a catalyst modified with other different amounts of alumina.

Conventional hydrogenation catalysts can often correspond to catalysts that are designed to balance a desire for sufficient hydrogenation activity with a conflicting desired for a reduced or minimized activity for catalyzing other types of chemistry, such as cracking of hydrocarbonaceous compounds. A common conventional catalyst to balance these desired activities is a catalyst with a noble metal on a refractory oxide support. Examples of conventional catalysts include catalysts with Pt or Pd supported on a support such as silica, alumina, silica-alumina, or another metal oxide support.

Conventionally, catalysts using a silica support have not been favored due to lower hydrogenation activity. Use of an alumina or a silica-alumina support can provide increased hydrogenation activity, but at the cost of also increasing the cracking activity of the resulting catalyst. With regard to the choice of hydrogenation metal, Pt has traditionally been considered as offering higher activity than Pd for hydrogenation. However, catalysts including only Pt as a hydrogenation metal have sometimes suffered an undesirable activity loss when used on a feedstock containing moderate (or greater) amounts of sulfur. Pd has been used as hydrogenation metals for aromatic saturation catalysts where environments with higher amounts of sulfur are expected. However, such catalysts have a lower initial activity for hydrogenation due to the reduced activity of Pd. Another option has been to try to use both Pt and Pd, to provide the increased activity of Pt while still obtaining some of the benefit of Pd for tolerating higher sulfur content feedstocks.

In some aspects, it is desired to provide a catalyst with improved hydrogenation activity where the amount of increase in the corresponding cracking activity of the catalyst is reduced or minimized. Additionally, in some aspects it is desired to provide a hydrogenation catalyst that can maintain an activity advantage when used for hydrogenation of a feedstock containing at least about 50 wppm of sulfur, or at least about 100 wppm of sulfur, or at least about 150 wppm of sulfur, or at least about 200 wppm of sulfur, or at least about 250 wppm of sulfur.

In order to at least partially achieve the above desired goals, a catalyst can be provided that includes a noble metal on a silica substrate, where additional alumina is also deposited/impregnated on the substrate. The alumina can be deposited, impregnated, or otherwise placed on the silica substrate in any convenient manner. The alumina can be added to the catalyst prior to addition of the hydrogenation metal, during addition of the hydrogenation metal, or after addition of the hydrogenation metal. The alumina-modified catalyst can provide improved hydrogenation activity for both feeds with sulfur contents below about 50 wppm as well as feeds with higher sulfur contents, such as feeds with at least about 100 wppm of sulfur, or at least about 150 wppm of sulfur, or at least about 200 wppm of sulfur, or at least about 250 wppm of sulfur.

In order to achieve an unexpected activity increase, the amount of alumina added to the catalyst can be in a specified range. In some aspects, the amount of alumina added to a catalyst can be about 0.1 wt % to about 3.0 wt %, or about 0.3 wt % to about 3.0 wt %, or about 0.3 wt % to about 2.5 wt %, or about 0.3 wt % to about 2.2 wt %, or about 0.3 wt % to about 2.0 wt %, or about 0.3 wt % to about 1.8 wt %, or about 0.3 wt % to about 1.6 wt %, or about 0.3 wt % to about 1.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt.% to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %. For alumina amounts greater than the desired range, some activity enhancement is produced by addition of alumina. However, the activity enhancement is substantially lower than the activity enhancement within the specified range. For alumina amounts less than the desired range, the activity of the catalyst can be similar to the activity of a catalyst without added alumina, or alternatively similar to the activity of catalysts having additional alumina amounts that are greater than the desired range.

Conventionally, it has been believed or suspected that the activity of catalysts with hydrogenation metals deposited on a metal oxide support can be impacted by the amount of dispersion of the hydrogenation metals. Under such a conventional understanding, further impregnation or other deposition of alumina on a catalyst could lead to lower dispersion values. However, it has been unexpectedly determined that deposition of alumina on a Pt impregnated catalyst results has a reduced or minimized impact on the dispersion of the Pt.

Feedstocks

A wide range of petroleum and chemical feedstocks are suitable for processing by exposing the feedstock to an alumina-modified catalyst under effective conditions for hydrogenation and/or aromatic saturation in accordance with the invention. Suitable hydrocarbonaceous feedstocks can include raw or virgin feeds as well as feeds that have previously been processed (such as hydroprocessed) in one or more reaction stages. Examples of suitable hydrocarbonaceous feedstocks include, but are not limited to, whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, feeds derived from biological sources, raffinates, naphtha boiling range fractions (boiling range of about 36° C. or about the boiling point of n-pentane to about 177° C.), hydrotreated naphtha boiling range fractions, diesel or other distillate fuel boiling range fractions (about 177° C. to about 370° C.), hydrotreated diesel or other distillate fuel boiling range fractions, lubricant base oil boiling range fractions (about 370° C. to about 538° C.), hydrotreated lubricant base oil boiling range fractions, and mixtures of these materials.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil. It is noted that the boiling ranges noted above can correspond to boiling ranges defined by initial and final boiling points, T5 and T95 boiling points, T10 and T90 boiling points, or combinations thereof. For example, the lubricant base oil boiling range can correspond to an initial, T5, or T10 boiling point of about 370° C. and a final, T95, or T90 boiling point of about 538° C. Similarly, the diesel boiling range can be an initial, T5, or T10 boiling point of about 177° C. and a final, T95, or T90 boiling point of about 370° C.

The sulfur content of the feed can be any convenient amount, but preferably less than about 1000 wppm. In some aspects, the sulfur content of a feed exposed to the hydrogenation catalyst can be about 100 wppm or less, or about 50 wppm or less, or about 25 wppm or less, or about 15 wppm or less. In other aspects, the sulfur content of a feed exposed to a hydrogenation catalyst can be from 0 wppm to about 1000 wppm, or about 500 wppm or less, or about 300 wppm or less. Examples of ranges for sulfur content can include from about 50 wppm to about 1000 wppm, or about 100 wppm to about 1000 wppm, or from about 200 wppm to about 1000 wppm, or about 250 wppm to about 1000 wppm, or from about 50 wppm to about 500 wppm, or about 100 wppm to about 500 wppm, or from about 200 wppm to about 500 wppm, or about 250 wppm to about 500 wppm, or from about 10 wppm to about 1000 wppm, or about 10 wppm to about 500 wppm, or from about 50 wppm to about 300 wppm, or about 100 wppm to about 300 wppm, or from about 200 wppm to about 300 wppm, or about 10 wppm to about 1000 wppm.

Modified Silica-Supported Hydrogenation Catalysts

In sonic aspects, a hydrogenation catalyst suitable for treating a feed can comprise, consist essentially of, or be a catalyst composed of one or more Group VIII metals on a silica support that is modified with alumina, as described in more detail herein. The modification with alumina can provide an unexpected enhancement in the hydrogenation activity of the catalyst.

The supported Group VIII metal(s) can include, but are not limited to, Pt, Pd, Rh, Ir, and combinations thereof. Examples of individual hydrogenation metal embodiments can include, but are not limited to, Pt only or Pd only, while mixed hydrogenation metal embodiments can include, but are not limited to, Pt and Pd, Pt and Rh, or another combination. When only one hydrogenation metal is present, the amount of that hydrogenation metal can be at least about 0.1 wt % based on the total weight of the catalyst, for example at least about 0.3 wt %, or at least about 0.5 wt %, or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 2.0 wt % or less, about 1.5 wt % or less, about 1.0 wt % or less, about 0.9 wt % or less, about 0.75 wt % or less, or about 0.6 wt % or less. Each of the lower and upper bounds identified above for the amount of the only one hydrogenation metal is explicitly contemplated in combination with each other. Thus, for example, the amount of hydrogenation metal can be about 0.1 wt % to about 5.0 wt %, or about 0.1 wt % to about 2.5 wt %, or about 0.1 wt % to about 2.0 wt %, or about 0.1 wt % to about 1.5 wt %, or about 0.3 wt % to about 5.0 wt %, or about 0.3 wt % to about 2.5 wt %, or about 0.3 wt % to about 1.5 wt %, or about 0.5 wt % to about 5.0 wt %, or about 0.5 wt % to about 2.5 wt %, or about 0.5 wt % to about 1.5 wt %.

When more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternately when more than one hydrogenation metal is present, the collective amount of hydrogenation metals can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Each of the lower and upper bounds identified above for the combined amount of the hydrogenation metal is explicitly contemplated in combination with each other. Thus, for example, the combined amount of hydrogenation metal can be about 0.1 wt % to about 5.0 wt %, or about 0.1 wt % to about 2.5 wt %, or about 0.1 wt % to about 2.0 wt %, or about 0.1 wt % to about 1.5 wt %, or about 0.3 wt % to about 5.0 wt %, or about 0.3 wt % to about 2.5 wt %, or about 0.3 wt % to about 1.5 wt %, or about 0.5 wt % to about 5.0 wt %, or about 0.5 wt % to about 2.5 wt %, or about 0.5 wt % to about 1.5 wt %. For aspects where both Pt and Pd are present as the hydrogenation metals, the ratio of Pt to Pd can be from about 1:3 to about 4:1, or from about 1:3 to about 4:1, or from about 1:4 to about 3:1, or from about 1:2 to about 4:1, or from about 1:2 to about 3:1. The amounts of metal(s) may be measured by methods specified by ASTM for individual metals, including but not limited to atomic absorption spectroscopy (AAS), inductively coupled plasma-atomic emission spectrometry (ICP-AAS), or the like.

In some aspects, the silica support can be an amorphous silica support. In other aspects, the support can be a mesoporous crystalline or semi-crystalline support material. Examples of mesoporous silica materials suitable for use as a support can include MCM-41, other M41S structures, SBA-15, and other mesoporous silicas.

The silica support can be modified with alumina to provide an unexpectedly superior activity for performing hydrogenation. The amount of alumina added to the silica support to modify the support can vary depending on the expected sulfur content of the feed for the hydrogenation process.

For general feeds and/or feeds having a sulfur content of about 100 wppm or less, or about 50 wppm or less, the amount of alumina added to the silica support can be about 0.3 wt % to about 3.0 wt %, or about 0.3 wt % to about 2.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %.

For feeds with sulfur contents of at least about 50 wppm, or at least about 100 wppm, such as a sulfur content of about 1000 wppm of sulfur or less, or about 500 wppm of sulfur or less, the amount of alumina added to the silica support can be about 0.3 wt % to about 3.0 wt %, or about 0.3 wt % to about 2.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %.

The alumina for modifying the supported catalyst can be added by any convenient method, such as impregnation using a solution containing alumina or a suitable alumina precursor. For example, an alumina precursor can be deposited by aqueous incipient wetness impregnation followed by heating the catalyst to decompose the precursor. The alumina can be added to the catalyst support at any convenient time, such as prior to, during, or after deposition of the hydrogenation metal(s) on the catalyst support. In this description, alumina added to the supported catalyst at any time after formation of the support is defined as alumina that is deposited on the support and/or the catalyst.

Hydrogenation or aromatic saturation conditions can include temperatures from about 25° C. to about 425° C., such as about 75° C. to about 425° C., or about 100° C. to about 425° C., for example about 180° C. to about 280° C.; a hydrogen partial pressure from about 100 psig (0.7 MPa) to about 3000 psig (20.7 MPa), preferably about 500 psig (3.4 MPa) to about 2500 psig (17.2 MPa); and a liquid hourly space velocity from about 0.1 hr$^{-1}$ to about 5 hr$^{-1}$ LHSV, prefrably about 0.5 hr$^{-1}$ to about 1.5 hr$^{-1}$, Additionally, a hydrogen treat gas rate of from about 35.6 m$^3$/m$^3$ to about 1781 m$^3$/m$^3$ (200 SCF/B to 10,000 SCF/B) can be used.

EXAMPLES

The following examples provide information to illustrate various aspects of the invention. In the following examples, unless otherwise indicated, the catalyst is a silica supported catalyst with Pt added as a hydrogenation metal. The Pt was impregnated by incipient wetness onto a silica support available from Davison. The silica support had a surface area of about 290 m$^2$/g, a pore diameter of about 150 Å, a 35-60 mesh size, and an incipient wetness pore volume of about 1.1 cc/g. In each example the Pt precursor used was a tetraammineplatinum(II)nitrate containing about 50.1% wt. of Pt. The various examples were designed as aqueous preparations. Some of the supported catalysts were prepared by dissolving the tetraammineplatinum(II)nitrate in water and adding it by incipient wetness to the silica. These catalysts were then dried at about 100° C. and calcined to different temperatures as indicated. For other catalysts, the amino acid arginine (arg) was added to the impregnation solution as a bifunctional organic dispersant. The amount of arginine added was such that the arginine to Pt mole ratio was about 8:1. The arginine was dissolved in the aqueous solution containing tetraammineplatinum(II)nitrate and this liquid was impregnated by incipient wetness onto the silica support and dried at about 100° C. These arginine impregnated catalysts were then calcined to about 425° C. to decompose the organic. For the catalysts with impregnated alumina, the alumina was added by aqueous incipient wetness impregnation of aluminum nitrate, which was then decomposed at about 375° C. Depending on the sample, alumina was added either after, during, or before the Pt addition. Thermogravimetric Differential Thermal Analysis (TG/DTA) scans at programmed heating rates of 4° C./min were used to monitor the sequential decomposition of the complexes. Oxygen chemisorption was used to measure the number of surface metal sites.

Example 1a 0.8 % Pt/SiO$_2$—0.319 g of Pt tetrammine nitrate (containing 50.1% wt. of Pt) was dissolved into deionized water to a final volume of about 22 cc and this resulting solution was added by incipient wetness to 19.84 g of a silica support. The sample was dried at 100° C. overnight and then heated according to a temperature program at 0.5° C./min to 350° C. and held at 350° C. for 4 h. The calcined sample was denoted as Pt (H$_2$O)/SiO$_2$.

Example 1b 0.8% Pt/Al$_2$O$_3$—A sample similar to Example 1a was prepared that used an alumina support composed of Versal 300 alumina (available from UOP) in place of the silica support. The calcined sample was denoted as Pt/Al$_2$O$_3$.

Example 2

0.8% Pt/SiO$_2$ with Arginine—0.319 g of Pt tetrammine nitrate (containing 50.1% wt. of Pt) and 1.143 g of arginine were dissolved in deionized water such that the total solution volume was about 22 cc. This solution was impregnated by incipient wetness onto 19.84 g of a silica support. The sample was dried at 100° C. overnight and the dried samples were calcined in a box furnace with a heating rate of 0.5° C./min to 425° C. and held at that temperature four hours. This was believed to be sufficient to substantially completely oxidize the arginine.

Example 3b 2.1% Al$_2$O$_3$ impregnated on 0.8% Pt/SiO$_2$ with Arginine—2.94 g of aluminum nitrate nonahydrate was dissolved in distilled water to give a solution volume of about 22 cc. 19.6 g of the catalyst in Example 2 was impregnated by incipient wetness using the alumina nitrate solution. The sample was dried overnight at 100° C. and then heated at 0.5° C./min to 375° C. and held at that temperature for 4 hours.

Example 3a-3e

Samples similar to that described in Example 3b but with varying loadings of alumina on the catalyst were prepared. Table 1 lists the catalysts which contained 0.8% Pt on silica to which alumina in varying amounts was added by incipient wetness followed by calcination.

TABLE 1

Samples of 0.8% Pt/SiO$_2$ With Added Al$_2$O$_3$

| | For 20 g catalyst | | | |
|---|---|---|---|---|
| Sample # | wt % | g Al2O3 | g Pt/SiO2 | g Al nitrate |
| 3a | 1.0 | 0.20 | 19.8 | 1.47 |
| 3b | 2.1 | 0.40 | 19.6 | 2.94 |
| 3c | 3.0 | 0.60 | 19.4 | 4.42 |
| 3d | 6.8 | 1.36 | 18.6 | 10.0 |
| 3e | 16.8 | 3.36 | 16.6 | 24.7 |

Example 4

0.8% Pt/SiO$_2$ with Arginine impregnated onto 2% Al$_2$O$_3$/SiO$_2$ support (reverse sequence)—Synthesis of a catalyst similar to Sample 3b was repeated but the sequence of the addition of Pt and alumina was reversed. 2.94 g of aluminum nitrate nonahydrate was dissolved in distilled water to give a solution volume of about 22 cc. The alumina nitrate solution was impregnated by incipient wetness onto 19.6 grams of silica support. After overnight drying at 100° C., the sample was calcined at 0.5° C./min to 375° C. and held at 375° C. for four hours. 0.319 g of Pt tetrammine nitrate (containing 50.1% wt. of Pt) and 1.143 g of arginine were dissolved in deionized water such that the total solution volume was about 22 cc. This solution was impregnated by incipient wetness onto 19.84 g of the "2% $Al_2O_3$ on silica" prepared in the first step of this example, dried at 100° C. overnight and then heated at 5° C./min to 425° C. and held at that temperature for four hours. This sample is referred to herein as Sample 3b-R.

Example 5

Additional Catalyst Samples

For Sample 5a, a catalyst similar to Sample 3a was prepared, but the catalyst was prepared without the use of Arginine as an organic additive.

For Sample 5b, a catalyst was prepared according to Example 6b (see below), with 1.0 wt % added alumina.

For Samples 5c and 5d, catalysts similar to Samples 3a and 3b were prepared, but Pt was impregnated on the catalyst after deposition of the $Al_2O_3$, as opposed to impregnating with Pt prior to deposition of the $Al_2O_3$.

For Sample 5e, a catalyst was prepared according to Example 6e (see below) with 1.0 wt % of added alumina.

For Sample 5f, a catalyst similar to Sample 3a was prepared, but Pt was impregnated at the same time as deposition of the $Al_2O_3$.

For Samples 5g and 5h, a catalyst was prepared according to Example 6g (see below). Sample 5g had 1.0 wt % added alumina, while Sample 5h had 2.0 wt % added alumina.

Examples 6a-6i

Pt—Pd Alloy Series on Silica—For Examples 6a-6i, the steps in example 2 were followed, but with co-mixing of the 50.10% Pt_tetrammine nitrate solution with a tetrammine Pd nitrate solution of 8.5% Pd content in varying amounts. The solutions were used to impregnate about 19.9 g of silica support by incipient wetness. The arginine to total (Pt+Pd) molar ratio was kept at about 8:1 and all the samples had about the same molar content of (Pt+Pd). This corresponded to having about 1.14 g of arginine on the catalyst support prior to calcination. All calcinations were performed in a manner similar to example 2. FIG. 1 provides the details for the Pt—Pd/$SiO_2$ catalysts (optionally with alumina modification) that were made using this procedure.

Example 7

0.8% Pt+1% $Al_2O_3$ co-impregnated onto $SiO_2$ with Arginine—A catalyst similar to sample 3a was prepared except that the alumina and platinum precursors were commixed and coimpregnated. The arginine content was maintained at 8:1 moles arginine/moles Pt. In this preparation, 0.74 g of aluminum nitrate, 0.16 g of Pt tetraammine nitrate (containing 50.1% wt. of Pt) solution, and 0.57 g of arginine were mixed into an aqueous solution of water adjusted to 10 cc. This was impregnated in a single step onto 9.9 g of silica. The dried sample was calcined in a box furnace with a heating rate of 0.5 deg/min to 425° C. and held at that temperature four hours.

Example 8

Silica-Alumina Comparative Catalysts—Comparative Samples 8a and 8b were composed of Pt supported on a commercially available amorphous silica-alumina support obtained from Grace Davison (75% wt. $SiO_2$ and 25% wt. $Al_2O_3$). For Sample 8a, Pt was impregnated on to the silica-alumina support in a manner similar to sample 1 (aqueous preparation using tetrammine Pt nitrate).

Sample 8b contained 1.7 wt % Pt was prepared by the method of selective electrostatic adsorption. In the preparation of sample 10c, 2.25 g of a 7.33% solution of tetrammine Pt hydroxide was diluted with water to make a total solution volume of about 100 cc. The resulting pH of the solution was 11.4. 10 g of the $SiO_2$—$Al_2O_3$ support material was suspended in the Pt solution and ammonium hydroxide was slowly added to the solution in order to maintain the pH at 10. The sample was filtered and dried overnight at 100° C. and then heated at 0.5 deg/min to 375° C. and held at that temperature for 4 hours.

Example 9

Measurement of Chemisorption Properties—Chemisorption measurements were obtained under static high vacuum conditions on a Quantachrome Autosorb 1A instrument. 0.2-0.4 g of catalyst was reduced in flowing hydrogen and heated at 2° C./min to the final reduction temperature and held at that temperature for 2 hours. Following reduction, the sample was evacuated (while still at the reduction temperature) with a turbomolecular pump for 30 minutes to remove any chemisorbed hydrogen. With the sample still under vacuum, the temperature was lowered to 40° C. and held isothermal during subsequent treatments. An 8-point isotherm (with pressures between 80 and 400 torr) was measured at 40° C. with $O_2$ as the adsorbent molecule. The weak (or back) O isotherms reflected near zero oxygen uptake on the support and near zero multiple layer oxygen on the metals.

Figure 3:
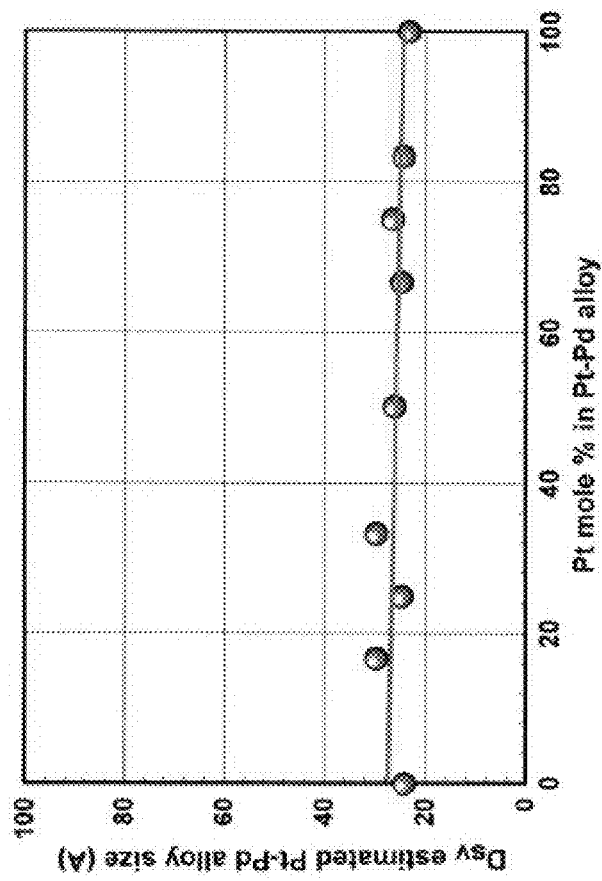
FIG. 3 shows calculated particle size values for various hydrogenation catalysts.

The oxygen chemisorption values of the catalysts that were prepared according to Example 6 were measured and the results are shown in FIG. 2. The plot shown in FIG. 2 represents a percentage of metal dispersion, as the amount of O that is chemisorbed is believed to be proportional to the amount of surface Pt and Pd adsorption sites. The calculated metal particles sizes for the catalysts that were prepared in Example 6 are shown in FIG. 3. It is noted that the metal particle sizes were similar in all the samples and range from 2.5 to 3 nm. Chemisorption data was also collected for other samples. The metal dispersion values for the additional samples are shown in Table 2. It is noted that in Table 2, the amount of Pt or Pd supported on the catalysts is about 0.8 wt % for all samples except for 8a (1 wt % Pt), and 8b (1.7 wt % Pt).

TABLE 2

Metal Dispersion Values

| Sample # | Catalyst Description | % Metal Dispersion |
| --- | --- | --- |
| 2 | Pt(Arg)/$SiO_2$ Arginine prep. | 52.1 |
| 2 repeat | Pt(Arg)/$SiO_2$ Arginine prep. Repeat | 44.9 |
| 1a | Pt($H_2O$)/$SiO_2$ Aqueous prep. | 39.7 |
| 1b | Pt/$Al_2O_3$ Aqueous prep. | 33.1 |
| 3a | Pt(Arg)/$SiO_2$ + 1.0% $Al_2O_3$ post impreg | 40.6 |
| 3b | Pt(Arg)/$SiO_2$ + 2.1% $Al_2O_3$ post impreg | 43.3 |
| 3c | Pt(Arg)/$SiO_2$ + 3.0% $Al_2O_3$ post impreg | 37.0 |
| 3d | Pt(Arg)/$SiO_2$ + 6.8% $Al_2O_3$ post impreg | 43.4 |
| 3e | Pt(Arg)/$SiO_2$ + 16.8% $Al_2O_3$ post impreg | 41.7 |
| 8a | Pt(Arg)/amorphous Silica-Alumina (75-25) | 30.9 |
| 8b | Pt/Amorphous Silica-Alumina (75-25) | 56.1 |

TABLE 2-continued

Metal Dispersion Values

| Sample # | Catalyst Description | % Metal Dispersion |
|---|---|---|
| | selective electrostatic adsorption | |
| 5a | Pt(H$_2$O)/SiO$_2$ + 1.0% Al$_2$O$_3$ post impreg | 32.7 |
| 5c | Pt(Arg)/1% Al$_2$O$_3$ IW/SiO$_2$ (Pt added to Al/Si) | 33.6 |
| 5d | Pt(Arg)/2% Al$_2$O$_3$ IW/SiO$_2$ (Pt added to Al/Si) | 34.5 |
| 5f | (1% Al$_2$O$_3$ + Pt(Arg)) on SiO$_2$ coimpregnation | 28.4 |
| 6g | 5Pd:1Pt(Arg) | 38.2 |
| 5g | 2.0% Al$_2$O$_3$/5Pd:1Pt(Arg) | 19.2 |
| 6b | Pd(Arg) | 46.6 |
| 5b | 1.0% Al$_2$O$_3$/Pd(Arg) | 21.3 |
| 6e | 1Pd:5Pt(Arg) | 45.3 |
| 5e | 1.0% Al$_2$O$_3$/1Pd:5Pt(Arg) | 36.2 |

Based on the data in Table 2, it appears that for Pt on silica, there is not an appreciable effect on the chemisorption values with the addition of the alumina by impregnation. The highest dispersed sample on silica-alumina was obtained on the sample prepared by selective electrostatic adsorption (sample 8b). For Pd on silica, it appears that the chemisorption values are impacted by the addition of alumina, as shown by the strong difference in chemisorption values for samples 5e (5:1 Pd to Pt) and 5b (all Pd). For sample 5g with a lower amount of Pd (1:5 Pd to Pt), addition of alumina produced a more modest reduction in metal dispersion.

Example 10

2-methylpent-2-ene acidity test—A variety of samples were evaluated for acidity using a 2-methylpent-2-ene (2MP2) isomerization test. The formation rates and rate ratios of the product hexene isomers of this test reaction reflect the relative acid site concentrations. The product hexene isomers formed include 4-methylpent-2-ene (4MP2), t-3-methylpent-2-ene (t-3MP2), and 2,3 dimethylbute-2-ene (2,3 DMB2). 4MP2 requires only a double bond shift, a reaction occurring on weak acid sites. 3MP2 requires a methyl group shift (i.e., a stronger acidity requirement than double bond shift), whereas the double branched 2,3DMB2 product requires even stronger acidity. For a homologous series of solid acids, differences in t-3MP2 rates normalized with respect to 4MP2 reflect the density of acid sites possessing strengths sufficient to catalyze skeletal isomerization. The isomerization of 2-methylpent-2-ene was conducted by flowing a helium stream containing 7 mol % olefin at 101 kPa at a rate of 150 cm$^3$/min over 1 g of catalyst contained in a 22 cm$^3$ stainless-steel reactor. The reaction products were analyzed after reaction at one and two hours at 250° C., then after an additional hour at 350° C. and finally after one more hour at 250° C. Catalysts were pretreated in flowing helium for about 1 hr at 500° C. before use. Products were analyzed with an on-line Varian 3700 gas chromatograph containing a 50-m capillary column which was able to resolve all 17 hexene isomers. The capillary column was coated with SP-2100.

Figure 4:
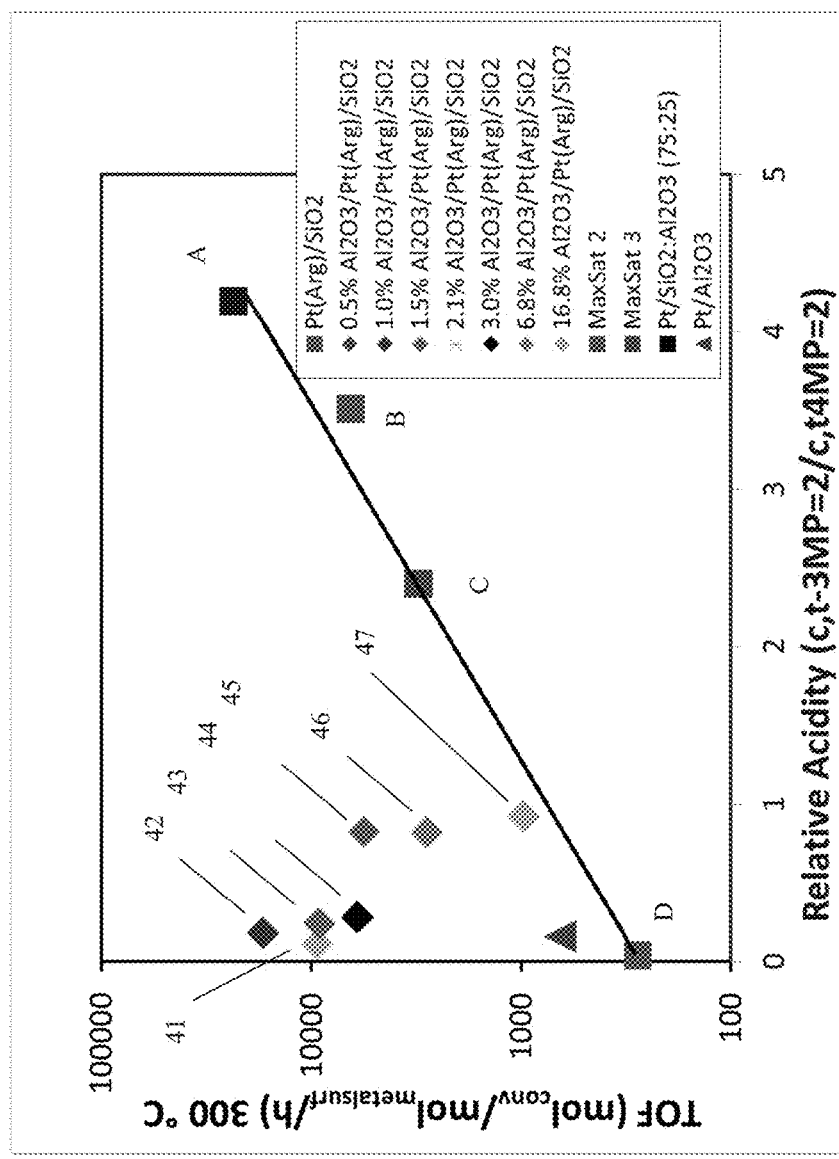
FIG. 4 shows activities for isomerization and cracking of model compounds for various hydrogenation catalysts.

FIG. 4 shows the relative acidity for various samples characterized using the 2MP2 isomerization test. The samples shown as diamonds in FIG. 4 correspond to silica-based catalysts with various amounts of alumina impregnated on the silica substrate. In FIG. 4, Diamond 41 corresponds to 0.5 wt % Al$_2$O$_3$; Diamond 42 corresponds to 1.0 wt % Al$_2$O$_3$; Diamond 43 corresponds to 1.5 wt % Al$_2$O$_3$; Diamond 44 corresponds to 2.1 wt % Al$_2$O$_3$; Diamond 45 corresponds to 3.0 wt % Al$_2$O$_3$; Diamond 46 corresponds to 6.8 wt % Al$_2$O$_3$; and Diamond 47 corresponds to 16.8 wt % Al$_2$O$_3$. For comparison, other types of catalysts were also characterized, including a catalyst composed of Pt on an alumina substrate (triangle symbol, similar to Example 1b); a catalyst composed of Pt on silica-alumina substrate (square symbol A, similar to Example 8); two commercially available catalysts corresponding to a combination of Pt and Pd deposited on alumina-bound MCM-41 substrates, the MCM-41 having a silica to alumina ratio of about 50:1 (square symbols B and C); and a catalyst composed of Pt on silica without any additional impregnated alumina (square symbol D).

FIG. 4 shows that addition of alumina by impregnation to the silica results in increases in the skeletal isomerization rate, with the highest relative turnover frequencies being shown at alumina amounts of about 0.5 wt % (Diamond 41) to about 3.0 wt % (Diamond 45). This rate of isomerization is increased, however, without causing a substantial increase in overall acidity. As a comparison, use of a catalyst with a silica-alumina substrate (square symbol A) provides an increase in turnover frequency, but also results in a substantial increase in the relative number of strong acid sites as indicated by the increase in the ratio of 3MP2 versus 4MP2 generated for the silica-alumina based catalyst.

Example 11

Figure 5:
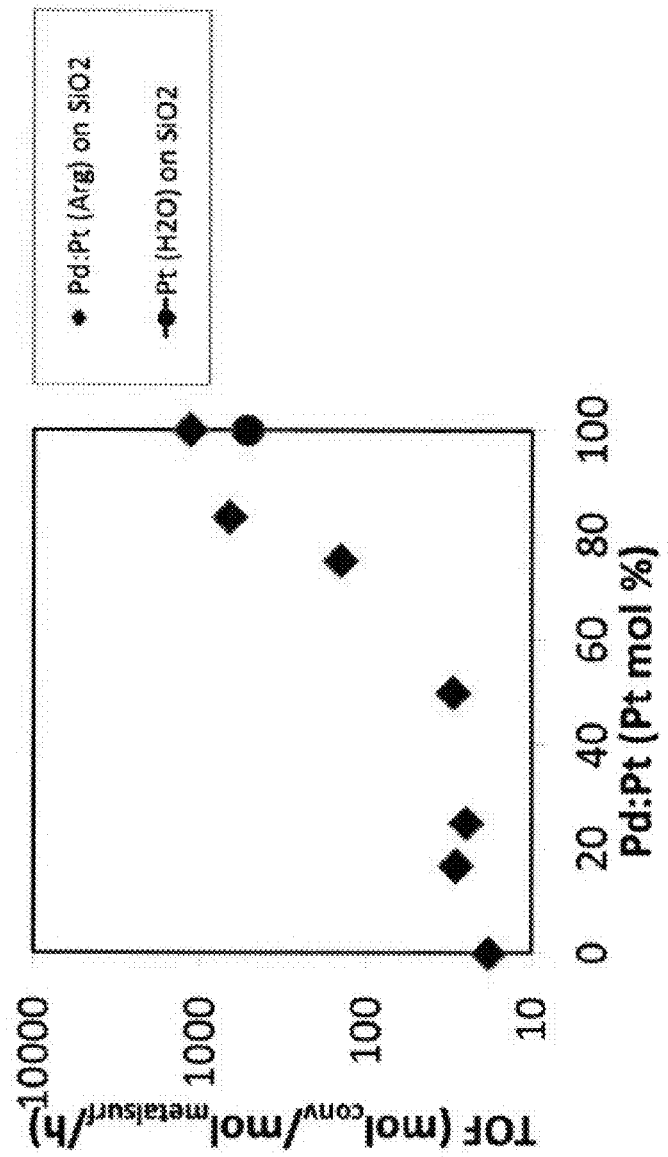
FIG. 5 shows activities for various hydrogenation catalysts in a substantially sulfur free feed.

Toluene Hydrogenation Test in Absence of Sulfur—Samples 6a-6i were evaluated for activity for toluene hydrogenation in a sulfur-free environment by measurement in a (sulfur-free) fixed bed reactor running at 10 psig of pressure. Each sample was reduced at 400° C. for 2 h in flowing H$_2$ before the activity measurements. Depending on the activity of the catalyst, the following experimental variables were adjusted within the specified ranges to provide data with <20% toluene conversion: the hydrogen to toluene ratio (H$_2$/Tol) was fixed at 18; toluene WHSV varied from 5.4 hr$^{-1}$ to 8.6 hr$^{-1}$; catalyst mass was 0.05-0.250 g; and temperature was kept in the range of 40° C.-120° C. The products were quantified using online GC analysis. The rate data was normalized by the total number of metal sites as determined by O chemisorption and expressed as turnover number (moles of toluene converted per mole of metal surface sites). FIG. 5 shows the turnover number (e.g. activity data) for the various catalysts in samples 6a-6i.

As seen in FIG. 5, the hydrogenation rate was found to increase proportionally with the Pt content when the Pt mol % was greater than 50%, but the rates were constant within experimental error when the Pt mol % was less than 50%. This suggests that the catalyst surface in the low Pt scenario was Pd-rich. As the Pt content exceeded the amount of Pt that can be accommodated in the interior of a metal crystallite, some of the Pt had to be on the surface, and the activity reflected the higher intrinsic activity of Pt. Bimetallic particles with about 50% metal dispersion and about 50 mol % Pt were able to accommodate all the Pd on the surface. In other words, for an approximately 50% dispersion value, approximately half of the metal atoms are on the surface and about half are in the bulk portion of a particle. Without being bound by any particular theory, this suggests that Pd has a stronger proclivity to populate surface sites relative to Pt, so that Pt atoms can preferentially fill surface positions until there are no more available Pd atoms. At that point, Pt atoms can populate the remaining surface positions and only when there are no more Pd atoms to fill the surface position, do Pt atoms populate the surface. This observation is consistent with the notion that Pd-carbon bonding energy is higher than that of Pt-carbon. Based on the data in FIG. 5, without being bound by any particular theory, it also appears that there is not an electronic promotion effect of the sublayer Pt atoms on Pd.

Example 12

Toluene Hydrogenation in the presence of S for Pd—Pt on Silica—Samples 6a-6i were evaluated for their toluene hydrogenation activity in the presence of sulfur in a fixed bed reactor. Sulfur was introduced from a 500 ppm by weight sulfur solution of dipropyldisulfide in toluene. Dipropyl disulfide reacts with hydrogen to provide propane (by-product) and $H_2S$. The sulfur concentration in the toluene was varied (125, 250, 375, and 500 ppmw) by co-feeding a clean toluene solution from a second pump. Reactions were performed at 300 psig. The catalysts were activated at 400° C. for 3 hours in flowing $H_2$ before the activity measurements. Unless otherwise specified, the hydrogen to toluene ratio ($H_2$/Tol) was fixed at 23. Depending on the activity of the catalysts, the following experimental variables were adjusted within the specified ranges to provide data with less than about 20% toluene conversion: Toluene space velocity ($mol_{Tol}/mol_{Metal}/s$) from 0.19 to 2.3; catalyst mass=0.050-0.8 g; and temperature of 270° C.-360° C.

Figure 6:
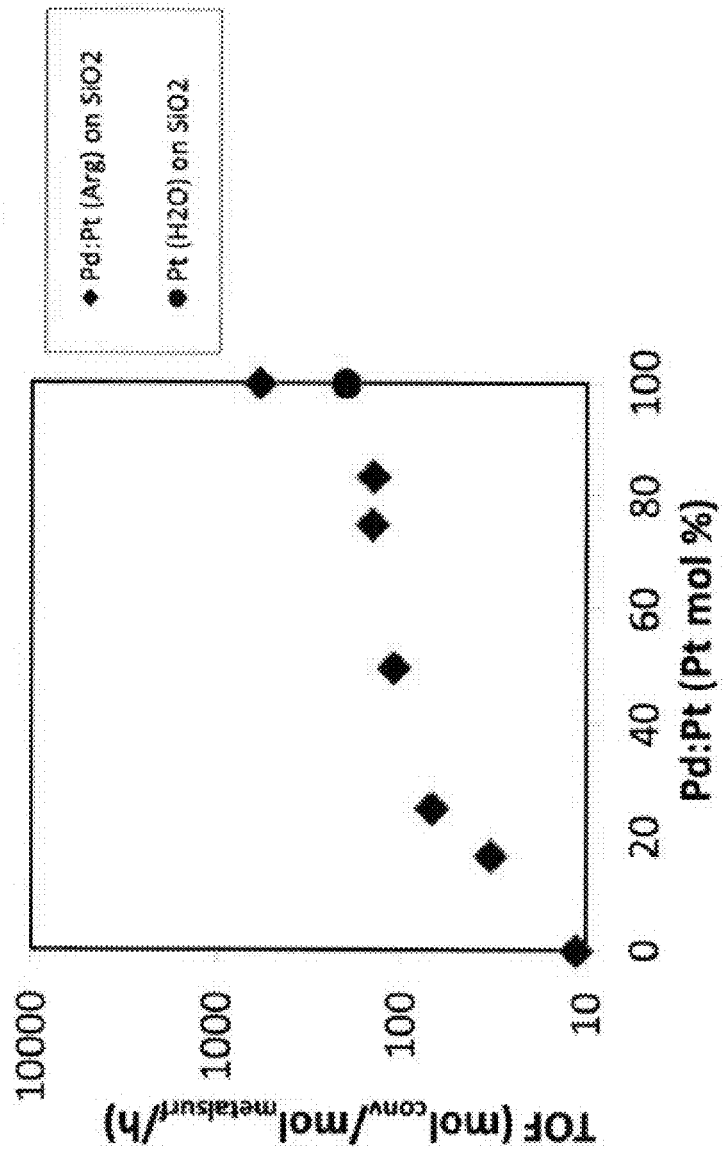
FIG. 6 shows activities for various hydrogenation catalysts in a sulfur-containing feed.

The results for the catalytic tests in the presence of sulfur revealed a similar trend to those without sulfur. The hydrogenation activity increases in going from pure Pd to pure Pt as shown in FIG. 6, which is contrary to the conventional understanding that a Pd-rich Pd:Pt bimetallic has increased activity and sulfur tolerance over Pt alone.

Example 13

Toluene Hydrogenation test for Pt Samples—Catalysts 2, 3a, 3b, 3d, 3e, and 8b were tested for toluene hydrogenation in the presence of sulfur as described in example 12. The temperatures were adjusted to give comparable conversions where possible. The data are shown in FIG. 7a (sulfur-free feed) and FIG. 7b (feed with 250 wppm of sulfur).

Figure 7A:
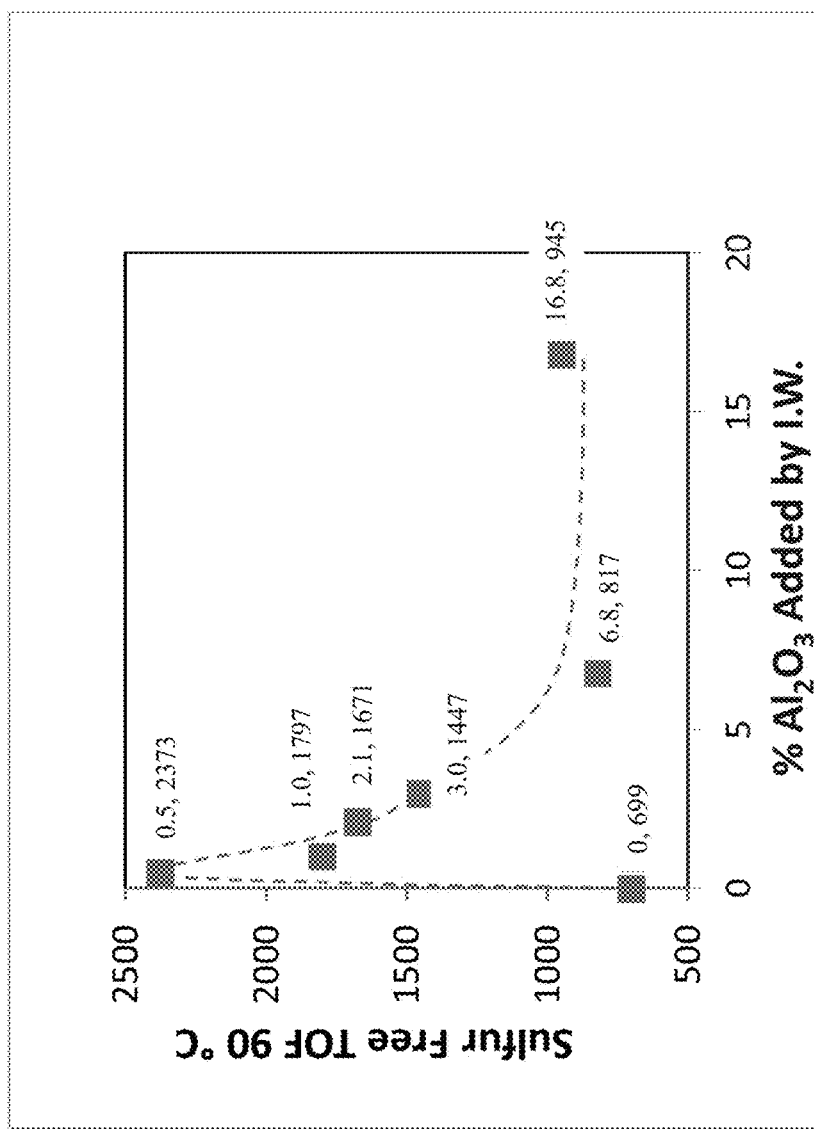
FIGS. 7a and 7b show activities for various hydrogenation catalysts relative to an alumina content for the catalysts.
Figure 7B:
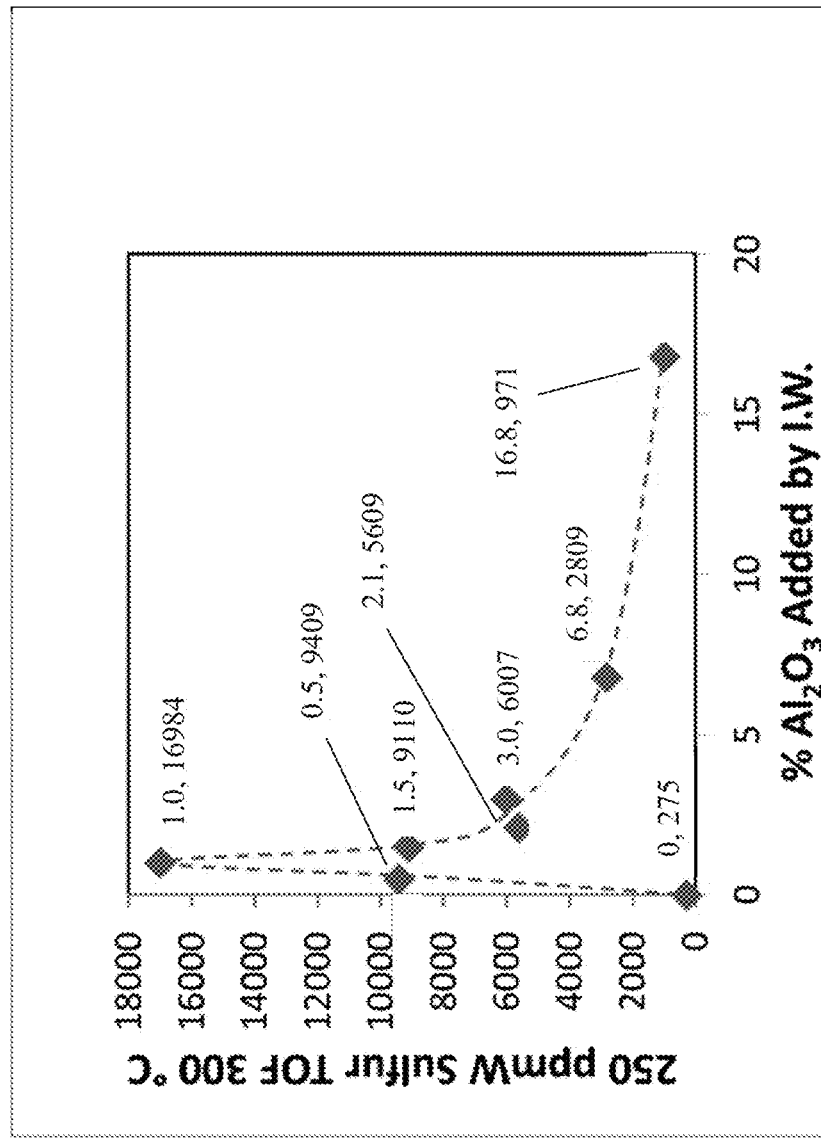

The data in FIGS. 7a and 7b shows that the activity per site passes through a maximum with alumina ($Al_2O_3$) additions of about 0.5 wt % to about 2.5 wt %. The location of the peak varies slightly depending on the sulfur content of the feed, with the maximum being between about 0.5 wt % to about 1.5 wt % for a sulfur-containing feed having about 250 ppmw of sulfur (FIG. 7b), while the maximum is between about 0.3 wt % and about 1.0 wt % for a substantially sulfur-free feed (FIG. 7a). As the amount of added alumina is further increased, the turnover frequencies approach that of catalyst with little or no added alumina. With regard to a comparison to conventional silica-alumina based catalyst, Table 3 shows that for the samples with low levels of alumina, when the conversions of toluene are adjusted to equivalent levels to the amorphous silica-alumina catalyst at similar temperatures, the cracking of the hydrogenated product (methyl cyclohexane) is reduced. In particular, the silica-based catalysts in Samples 2 and 3 result in almost no cracking, while the silica-alumina based catalyst of Sample 8b results in a noticeable amount of cracking of methyl cyclohexane.

TABLE 3

Cracking Selectivity of Toluene Hydrogenation

| Example # | Catalyst Description | % Tol Conv | % MCH Selectivity | Temp (° C.) |
|---|---|---|---|---|
| 2 | Pt(Arg) Arginine prep. | 11.2 | 99.8 | 320 |
| 3a | 1.0% $Al_2O_3$ IW/Pt(Arg) | 53.7 | 100.0 | 300 |
| 3b | 2.1% $Al_2O_3$ IW/Pt(Arg) | 44.7 | 99.9 | 310 |
| 8b | Pt(Arg) SiAl(75-25) | 54.1 | 97.4 | 290 |

Example 14

Comparison of Toluene Hydrogenation in Catalysts—A variety of samples were tested for toluene hydrogenation as in example 12 in the presence of sulfur. The results are shown in Table 4. The data in Table 4 show that deposition of $Al_2O_3$ on catalysts including both Pd and Pt as hydrogenation metals appears to have a similar impact on activity as compared to deposition of $Al_2O_3$ on a catalyst including Pt. However, as the ratio of Pd to Pt increases, the amount of benefit of addition of the $Al_2O_3$ decreases.

TABLE 4

Toluene Hydrogenation with Pd—Pt and impregnated Al

| Example # | Catalyst Description | Temp (° C.) | Rate $mol/mol_{cat}/h$ | TOF $mol/mol_{catsurf}/h$ |
|---|---|---|---|---|
| 6g | 5Pd:1Pt(Arg) | 300 | 13 | 33 |
| 5h | 2.0% $Al_2O_3$/5Pd:1Pt(Arg) | 300 | 58 | 300 |
| 6b | Pd(Arg) | 300 | 5 | 11 |
| 5b | 1.0% $Al_2O_3$/Pd(Arg) | 300 | 12 | 58 |
| 5e | 1Pd:5Pt(Arg) | 300 | 64 | 142 |
| 6e | 1.0% $Al_2O_3$/1Pd:5Pt(Arg) | 300 | 1358 | 3751 |
| 1a | Pt($H_2O$)/$SiO_2$ Aqueous prep. | 300 | 79 | 198 |
| 5a | Pt($H_2O$)/$SiO_2$ + 1.0% $Al_2O_3$ post impreg | 301 | 1774 | 5425 |

Example 15

Impact of Variations in Deposition Sequence on Toluene Hydrogenation—Samples 3a, 3b, 3b-R, and 7 were tested for toluene hydrogenation as in example 12 in the presence of sulfur. The results of the toluene hydrogenation using samples 3a, 3b, 3b-R, and 7 are shown in FIG. 8 in comparison with the results for toluene hydrogenation using sample 2. The data in FIG. 8 appears to show that the order of deposition for Pt relative to deposition of the $Al_2O_3$ has little or no impact on the activity for a catalyst.

Additional Embodiments

Embodiment 1. A method for hydrogenating a feedstock, comprising: exposing a hydrocarbonaceous feedstock to a supported catalyst under effective hydrogenation conditions to form a hydrogenated effluent, the supported catalyst comprising a Group VIII noble metal on a silica support, the supported catalyst further comprising about 0.3 wt % to about 3.0 wt % alumina deposited on the silica support.

Embodiment 2. The method of Embodiment 1, wherein the hydrocarbonaceous feed comprises about 100 wppm of sulfur or less, or about 50 wppm of sulfur or less.

Embodiment 3. The method of Embodiment 2, wherein the catalyst comprises about 0.3 wt % to about 2.1 wt % alumina deposited on the silica support, or about 0.5 wt % to about 3.0 wt % alumina deposited on the silica support.

Embodiment 4. The method of Embodiment 1, wherein the hydrocarbonaceous feed comprises at least about 100 wppm of sulfur, or at least about 150 wppm of sulfur, or at least about 200 wppm of sulfur.

Embodiment 5. The method of Embodiment 4, wherein the catalyst comprises about 0.5 wt % to about 1.5 wt % alumina deposited on the silica support.

Embodiment 6. The method of any of the above embodiments, wherein the effective hydrogenation conditions comprise a temperature from about 25° C. to about 425° C., or about 75° C. to about 425° C., or about 100° C. to about 425° C., or about 180° C. to about 280° C.; a hydrogen partial pressure from about 100 psig (0.7 MPa) to about 3000 psig (20.7 MPa), or about 500 psig (3.4 MPa) to about 2500 psig (17.2 MPa); a liquid hourly space velocity from about 0.1 $hr^{-1}$ to about 5 $hr^{-1}$ LHSV, or about 0.5 $hr^{-1}$ to about 1.5 $hr^{-1}$; and a hydrogen treat gas rate of from about 35.6 $m^3/m^3$ to about 1781 $m^3/m^3$ (200 SCF/B to 10,000 SCF/B).

Embodiment 7. The method of any of the above embodiments, wherein the supported catalyst comprises about 0.1 wt % to about 5.0 wt % of the Group VIII noble metal, or about 0.1 wt % to about 2.0 wt % of the Group VIII noble metal.

Embodiment 8. The method of any of the above embodiments, wherein the Group VIII noble metal is Pt, Pd, Rh, Ir, or a combination thereof; or wherein the Group VIII noble metal is Pt, Pd, or a combination thereof; or wherein the Group VIII noble metal is Pt.

Embodiment 9. The method of any of the above embodiments, wherein the Group VIII noble metal is Pt or a combination of Pt and one or more of Pd, Rh, or Ir, a molar ratio of Pt to the one or more of Pd, Rh, or Ir optionally being at least about 1:1, or at least about 3:1, or at least about 5:1.

Embodiment 10. The method of any of the above embodiments, wherein the alumina is deposited on the silica support by impregnation.

Embodiment 11. The method of any of the above embodiments, wherein the supported catalyst comprises amorphous silica, a mesoporous silica, or a combination thereof.

Embodiment 12. A hydrogenation catalyst, comprising: about 0.1 wt % to about 5 wt %, based on total catalyst weight, of a Group VIII noble metal on a silica support; and about 1.1 wt % to about 3.0 wt %, based on a total catalyst weight, of alumina deposited on the silica support, wherein the silica support is an amorphous silica support, a mesoporous silica support, or a combination thereof.

Embodiment 13. The hydrogenation catalyst of Embodiment 12, wherein the Group VIII noble metal is Pt, Pd, Rh, Ir, or a combination thereof; or wherein the Group VIII noble metal is Pt, Pd, or a combination thereof; or wherein the Group VIII noble metal is Pt.

Embodiment 14. The hydrogenation catalyst of Embodiment 12, wherein the Group VIII noble metal is Pt or a combination of Pt and one or more of Pd, Rh, or Ir, a molar ratio of Pt to the one or more of Pd, Rh, or Ir optionally being at least about 1:1, or at least about 3:1, or at least about 5:1.

Embodiment 15. The hydrogenation catalyst of any of Embodiments 12 to 14, wherein the supported catalyst comprises about 0.1 wt % to about 2.0 wt % of the Group VIII noble metal.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for hydrogenating a feedstock, comprising: exposing a hydrocarbonaceous feed to a supported catalyst under effective hydrogenation conditions, said hydrogenation comprising saturation of aromatics and/or olefins, to form a hydrogenated effluent, the supported catalyst comprising a Group VIII noble metal on a silica support, the supported catalyst further comprising about 0.3 wt % to about 2.5 wt % alumina deposited on the silica support; wherein the effective hydrogenation conditions comprise a temperature from about 75° C. to about 360° C.; a hydrogen partial pressure from about 100 psig (0.7 MPa) to about 3000 psig (20.7 MPa); a liquid hourly space velocity from about 0.1 $hr^{-1}$ to about 5 $hr^{-1}$ LHSV; and a hydrogen treat gas rate of from about 35.6 $m^3/m^3$ to about 1781 $m^3/m^3$ 200 SCF/bbl to 10,000 SCF/bbl).

2. The method of claim 1, wherein the hydrocarbonaceous feed comprises about 100 wppm of sulfur or less.

3. The method of claim 1, wherein the hydrocarbonaceous feed comprises about 50 wppm of sulfur or less.

4. The method of claim 3, wherein the supported catalyst comprises about 0.5 wt % to about 2.1 wt % alumina deposited on the silica support.

5. The method of claim 1, wherein the hydrocarbonaceous feed comprises at least about 100 wppm of sulfur.

6. The method of claim 5, wherein the supported catalyst comprises about 0.5 wt % to about 1.5 wt % alumina deposited on the silica support.

7. The method of claim 1, wherein the supported catalyst comprises about 0.1 wt % to about 5.0 wt % of the Group VIII noble metal.

8. The method of claim 1, wherein the Group VIII noble metal comprises Pt.

9. The method of claim 8, wherein the Group VIII noble metal further comprises one or more of Pd, Ir, or Rh, a molar ratio of Pt to the one or more of Pd, Ir, or Rh being at least about 1:1.

10. The method of claim 1, wherein the alumina is deposited on the silica support by impregnation.

11. The method of claim 1, wherein the supported catalyst comprises amorphous silica, a mesoporous silica, or a combination thereof.

12. A method for hydrogenating a feedstock, comprising: exposing a hydrocarbonaceous feed containing at least about 100 wppm sulfur to a supported catalyst under effective hydrogenation conditions, said hydrogenation comprising saturation of aromatics and/or olefins, to form a hydrogenated effluent, the supported catalyst comprising a Group VIII noble metal on a silica support, the supported catalyst further comprising about 0.5 wt % to about 2.5 wt % alumina deposited on the silica support; wherein the effective hydrogenation conditions comprise a temperature from about 75° C. to about 360° C.; a hydrogen partial pressure from about 100 psig (0.7 MPa) to about 3000 psig (20.7 MPa); a liquid hourly space velocity from about 0.1 $hr^{-1}$ to about 5 $hr^{-1}$ LHSV; and a hydrogen treat gas rate of from about 35.6 $m^3/m^3$ to about 1781 $m^3/m^3$ 200 SCF/bbl to 10,000 SCF/bbl).

13. The method of claim 12, wherein the supported catalyst comprises about 0.5 wt % to about 1.5 wt % alumina deposited on the silica support.

14. The method of claim 12, wherein the supported catalyst comprises about 0.1 wt % to about 5.0 wt % of the Group VIII noble metal, the Group VIII noble metal comprising Pt, Pd, or a combination thereof.

15. The method of claim 12, wherein the supported catalyst comprises alumina deposited by impregnation on an amorphous silica support, a mesoporous silica support, or a combination thereof.

* * * * *